United States Patent
Xiao et al.

(10) Patent No.: US 7,590,267 B2
(45) Date of Patent: Sep. 15, 2009

(54) ACCELERATED FACE DETECTION BASED ON PRIOR PROBABILITY OF A VIEW

(75) Inventors: Rong Xiao, Beijing (CN); Lei Zhang, Beijing (CN); Yan-Feng Sun, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 636 days.

(21) Appl. No.: 11/142,817

(22) Filed: May 31, 2005

(65) Prior Publication Data

US 2007/0053585 A1    Mar. 8, 2007

(51) Int. Cl.
  *G06K 9/00* (2006.01)
  *G06K 9/36* (2006.01)
  *H04N 9/04* (2006.01)

(52) U.S. Cl. ............ 382/118; 382/282; 382/289; 382/237; 382/170; 382/116; 348/221.1; 348/231.99; 348/207.99; 348/169; 348/77; 348/268; 348/208.13; 348/208.14

(58) Field of Classification Search ............ 382/118, 382/190, 159, 115, 289, 116, 282, 237, 170; 348/222.1, 231.99, 207.99, 77, 268, 208.13
See application file for complete search history.

(56) References Cited

U.S. PATENT DOCUMENTS

| | | | |
|---|---|---|---|
| 5,850,470 A * | 12/1998 | Kung et al. | 382/118 |
| 6,278,491 B1 * | 8/2001 | Wang et al. | 382/117 |
| 6,618,490 B1 * | 9/2003 | Cham et al. | 382/103 |
| 6,940,545 B1 * | 9/2005 | Ray et al. | 348/222.1 |
| 7,190,829 B2 * | 3/2007 | Zhang et al. | 382/165 |
| 7,224,850 B2 * | 5/2007 | Zhang et al. | 382/275 |
| 7,274,832 B2 * | 9/2007 | Nicponski | 382/297 |
| 7,319,780 B2 * | 1/2008 | Fedorovskaya et al. | 382/128 |

(Continued)

FOREIGN PATENT DOCUMENTS

WO    WO 03098536 A1 * 11/2003

(Continued)

OTHER PUBLICATIONS

Wu et al., 'Fast Rotation Invariant Multi-View Face Detection Based on Real Adaboost', May 17-19, 2004, Proceedings of the Sixth IEEE International Conference on Automatic Face and Gesture Recognition, pp. 79-84.*

(Continued)

*Primary Examiner*—Jingge Wu
*Assistant Examiner*—Nancy Bitar
(74) *Attorney, Agent, or Firm*—Perkins Coie LLP (57) ABSTRACT

A method and system for detecting faces at different views within images that allocates the computational effort based on a prior probability associated with a view is provided. A face detection system determines whether an image contains a face using detectors that are adapted to detect faces at various views and a filter that filters out windows of the image that are provided to a detector based on a prior probability associated with the view of the detector. Each view has an associated prior probability that a face from a collection of real-life home photographs will be at that view. The face detection system allocates increasing computational effort to a detector as the prior probability of its view increases.

16 Claims, 7 Drawing Sheets

U.S. PATENT DOCUMENTS

| | | | |
|---|---|---|---|
| 7,403,642 B2* | 7/2008 | Zhang et al. | 382/118 |
| 2002/0076088 A1* | 6/2002 | Tsai | 382/118 |
| 2002/0081003 A1* | 6/2002 | Sobol | 382/118 |
| 2004/0066966 A1* | 4/2004 | Schneiderman | 382/159 |
| 2004/0175021 A1* | 9/2004 | Porter et al. | 382/118 |
| 2004/0264744 A1* | 12/2004 | Zhang et al. | 382/118 |
| 2005/0013479 A1 | 1/2005 | Xiao et al. | |

FOREIGN PATENT DOCUMENTS

WO     WO 2004055696 A2 *   7/2004

OTHER PUBLICATIONS

Viola et al., 'Robust Real-time Object Detection', Feb. 2001, Compaq Cambridge Research Laboratory, Technical Report Series, CRL Jan. 2001, pp. 1-25.*

Xiao et al., 'Robust Multipose Face Detection in Images', Jan. 2004, IEEE Transactions on Circuits and Systems for Video Technology, vol. 14, No. 1, pp. 31-41.*

Ishii et al., 'Face Detection Based on Skin Color Information in Visual Scenes by Neural Networks', Oct. 12-15, 1999, 1999 IEEE International Conference on Systems, Man, and Cybernetics, vol. 5, pp. 350-355.*

Huang et al., 'Boosting Nested Cascade Detector for Multi-View Face Detection', Aug. 23-26, 2004, IEEE Proceedings of the 17th International Conference on Pattern Recognition, vol. 2, pp. 415-418.*

Viola et al., 'Rapid Object Detection using a Boosted Cascade of Simple Features', 2001, Proceedings of the 2001 IEEE Computer Society Conference on Computer Vision and Pattern Recognition, vol. 1, pp. 511-518.*

Sahbi et al., 'From Coarse to Fine Skin and Face Detection', Oct. 2000, Proceedings of the eighth ACM International Conference on Multimedia, pp. 432-434.*

Zhang et al., 'Real-Time Multi-View Face Detection', May 20-21, 2002, Proceedings of the Fifth IEEE International Conference on Automatic Face and Gesture Recognition, pp. 142-147.*

Pentland, Alex et al., "View-Based and Modular Eigenspaces for Face Recognition," M.I.T. Media Laboratory Perceptual Computing Section Technical Report No. 245, IEEE Conference on Computer Vision & Pattern Recognition, 1994 (7 pages).

Schneiderman, Henry et al., "A Statistical Method for 3D Object Detection Applied to Faces and Cars, "Robotics Institute, Carnegie Mellon University, Pittsburgh, PA (6 pages).

Rowley, Henry et al., "Neural Network-Based Face Detection," Copyright 1998 IEEE (28 pages).

Viola, Paul and Jones, Michael J., "Robust Real-Time Object Detection," COMPAQ, Cambridge Research Laboratory, Technical Report Series, CRL Jan. 2001, Feb. 2001 (25 pages).

Xiao, Rong et al., "Boosting Chain Learning for Object Detection," Proceedings of the Ninth IEEE International Conference on Computer Vision (ICCV 2003), 2003 (7 pages).

Xiao, Rong et al., "Robust Multi-Pose Face Detection in Images," IEEE Transactions on Circuits and Systems for Video Technology, Nov. 2003 ( (31 pages).

Hsu, Rein-Lien et al., "Face Detection in Color Images," IEEE Trans. on Pattern Analysis and Machine Intelligence, vol. 24, No. 5, 2002 (23 pages).

Stan Z. Li, Long Zhu, Zhenqiu Zhang, Andrew Blake, Hongjiang Zhang and Harry Shum, "Statistical Learning of Multi-View Face Detection," A. Heyden et al. (Eds.):ECCV 2002, LNCS 2353, pp. 67-81, Springer-Verlag Berlin Heidelberg 2002.

* cited by examiner

ACCELERATED FACE DETECTION BASED ON PRIOR PROBABILITY OF A VIEW

BACKGROUND

Automatic human face detection has a variety of useful applications such as in security systems, face detection systems, photo editing systems, and so on. Face detection is a challenging task because of the variances in images of background, view, illumination, articulation, and facial expression. Although face detection has recently become practical for certain limited applications, it generally is not practical for detecting the faces in real-life home photographs, in part because it is generally impossible to distinguish a face from background clutter in home photographs. Although frontal face detectors have met with some success, a significant percentage of faces in home photographs are non-frontal.

Many non-frontal face detectors use a view-based method, in which several face models are built, each describing faces in a given range of view. A "view" refers to the angle of rotation of a face. Out-of-plane rotation refers to the angle as the face looks to the left or right (e.g., a profile view), and in-plane rotation refers to the angle as the head tilts to the left or right. Multiple face models are used to avoid explicit three-dimensional modeling. In one conventional system, the views of a face are partitioned into five channels, and a multi-view detector is developed by training separate detectors for each view. There have also been studies of trajectories of faces in linear principal component analysis ("PCA") feature spaces as they rotate, and support vector machines ("SVMs") have been used for multi-view face detection and pose estimation.

Other conventional face detection systems have used multi-resolution information in different levels of a wavelet transform using an array of face detectors that are implemented in a view-based framework. For example, each detector can be constructed using statistics of products of histograms computed from examples of the respective view. Although this type of system may achieve acceptable detection accuracy in some applications, it is often very slow due to computational complexity.

To address the problem of slow detection speed, a coarse-to-fine, simple-to-complex pyramid approach combines the ideas of a boosting cascade and view-based methods. Although this approach improves the detection speed, it still has several problems. For example, since each boosting classifier works separately, the useful information between adjacent layers is discarded, which hampers the convergence of the training procedure. Furthermore, during the training process, this approach requires the classifiers in the earlier stage of the detector pyramid to cover a wide range of pose variations. Such a requirement increases the complexity of the learning process and results in low detection rate.

SUMMARY

A method and system for detecting faces at different views within images that allocates the computational effort based on a prior probability associated with a view is provided. A face detection system determines whether an image contains a face using detectors that are adapted to detect faces at various views and a filter that filters out windows of the image that are provided to a detector based on a prior probability associated with the view of the detector. The face detection system may have detectors for many different views such as an upright frontal view, an extended frontal view, profile views, and tilted views. Each view has an associated prior probability that a face from a collection of real-life home photographs will be at that view. The face detection system allocates increasing computational effort to a detector as the prior probability of its view increases. In this way, the face detection system efficiently recognizes faces by focusing its efforts on recognizing faces at views based on the prior probability that a face is at that view.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for detecting faces at different views within images that allocates the computational effort based on a prior probability associated with a view is provided. In one embodiment, a face detection system determines whether an image contains a face using detectors that are adapted to detect faces at various views and a filter that filters out windows of the image that are provided to a detector based on a prior probability associated with the view of the detector. The face detection system may have detectors for many different views such as an upright frontal view, an extended frontal view, profile views, and tilted views. Each view has an associated prior probability that a face from a collection of real-life home photographs will be at that view. For example, analysis of faces from home photographs indicates that approximately 80% of the faces are near upright frontal within in-plane rotation in the range of [−15°, 15°] and out-of-plane rotation in the range of [−45°, 45°], 8% of the faces are tilted faces within the range of in-plane rotation of [−110°, 110°], 15% of the faces are profile faces within the range of out-of-plane rotation of [−90°, 90°], and 12% of the faces have a partial occlusion, exaggerated expression, or extreme lighting conditions (referred to as extended frontal faces). The face detection system allocates increasing computational effort to a detector as the prior probability of its view increases. In this way, the face detection system efficiently recognizes faces by focusing its efforts on recognizing faces at views based on the prior probability that a face is at that view.

In one embodiment, the face detection system uses skin color as a filter to control the computational effort allocated to each view. Each detector of the face detection system is adapted to detect faces at a certain view. The face detection system divides an image into windows and submits the windows to detectors to determine whether the window contains a face at that view. To reduce the computational effort, the face detection system calculates a window skin confidence that indicates the likelihood that a window contains skin color. The face detection system discards those windows with a skin confidence that is below a threshold skin confidence that varies based on the prior probability of a view. In particular, the face detection system uses a lower threshold for detectors of views with a high prior probability and a higher threshold for detectors of views with a low prior probability. Thus, the face detection system discards more windows for detectors with a low prior probability and submits fewer windows to those detectors. As a result, the face detection system allocates more computational effort to detectors for views with a high prior probability of containing a face and less computational effort to detectors for views with a low prior probability of containing a face.

In one embodiment, the face detection system also uses window size or scale as a filter to control the computational effort allocated to each view. The face detection system divides the image into windows of varying sizes. For example, the face detection system may use a window size of 20×20 pixels, 23×23 pixels, 26×26 pixels, 30×30 pixels, and so on up to a maximum scale (e.g., 100×100 pixels). The windows at any particular scale may overlap to some degree. For example, the upper right corner of adjacent windows with a window size of 20×20 may be a distance of five pixels apart in either the x or y direction. The face detection system may reduce the computational effort allocated to a detector by limiting the scale of windows that are submitted to the detector based on a threshold scale that varies based on the prior probability of a view. In particular, detectors for views having a high prior probability have a threshold scale that is lower than detectors for views having a low prior probability. For example, if a detector has a prior probability of 0.8, then windows of all scale sizes may be submitted to that the detector. In contrast, if the detector has a prior probability of 0.2, then the windows of only medium scale and larger may be submitted to the detector. In this way, the face detection system allocates more computational effort to detectors with a high prior probability than detectors with a low prior probability.

Figure 1:
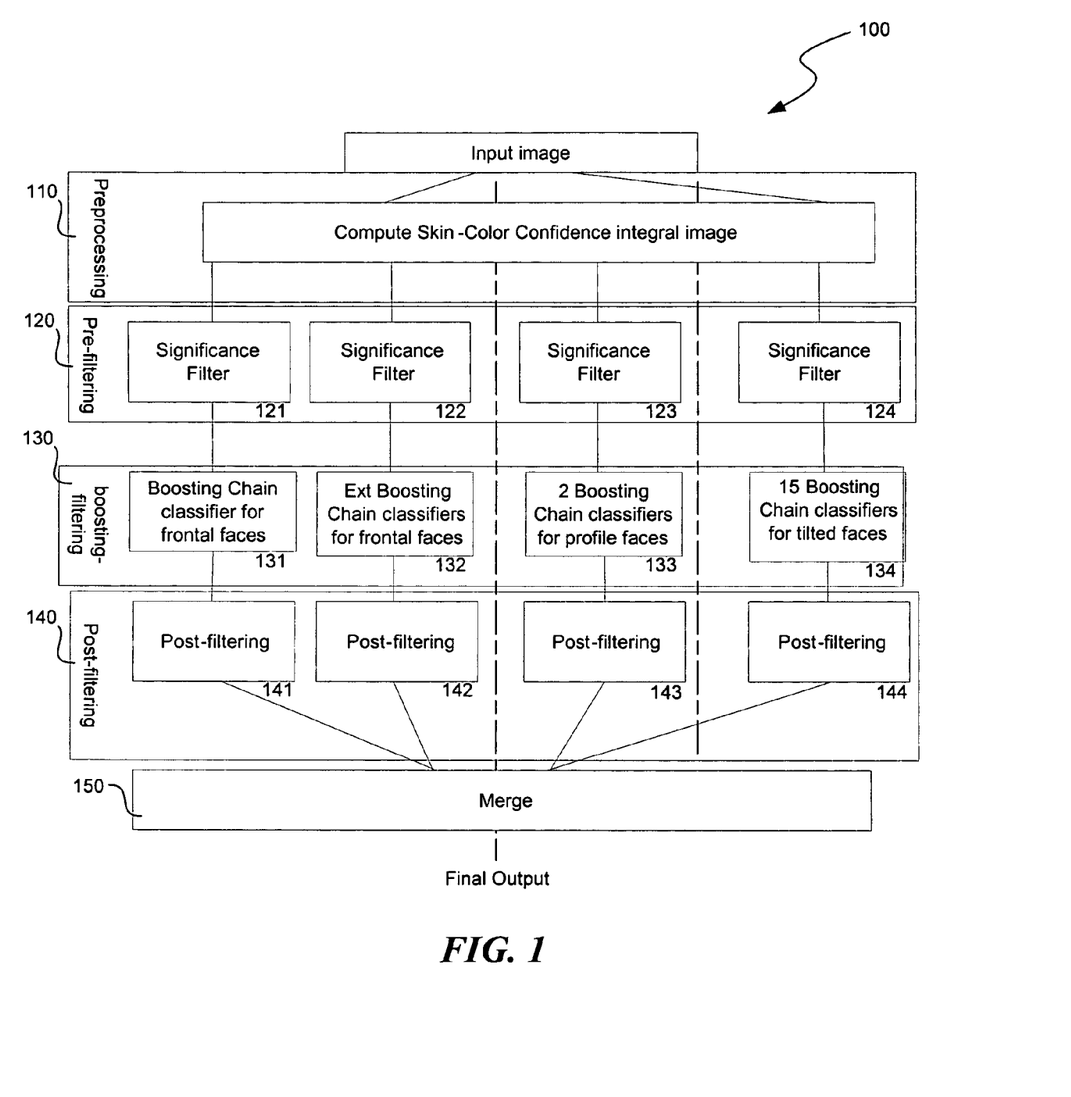
FIG. 1 is a block diagram illustrating the overall functions of the face detection system in one embodiment.

FIG. 1 is a block diagram illustrating the overall functions of the face detection system in one embodiment. The face detection system 100 includes a preprocessing component 110, detectors, and a merge component 150. Each detector includes a pre-filtering component 120, a boosting chain classifier component 130, and a post-filtering component 140. The preprocessing component inputs an image and calculates a window skin confidence that various windows of the image contain skin color. The window skin confidence is provided to the pre-filtering components of the detectors. The face detection system includes a detector for each view, each of which corresponds to a different face rotation angle. For example, the face detection system includes two detectors for frontal face views: significance filter 121, boosting chain classifier for frontal faces 131, and post-filtering component 141, and significance filter 122, boosting chain classifier for extended frontal faces 132, and post-filtering component 142. The face detection system includes two detectors for profile face views (e.g., out-of-plane rotations of ±90°) and 15 detectors for tilted face views (e.g., in-plane rotations of ±22°, ±45°, ±67°, ±90°, ±112°, ±135°, ±157°, and 180°). A significance filter component of a detector determines whether candidate windows of the image should be submitted to the boosting chain classifier of the detector based on the prior probability associated with the detector, on the size of the window, and on whether it contains enough skin color that it might possibly contain a face. A boosting chain classifier classifies the windows as containing faces or not. The merge component merges the results from the various detectors to determine whether the image contains faces. The use of boosting chain classifiers and filtering for detecting faces within an image are described in U.S. patent application Ser. No. 10/621,260, entitled "Robust Multi-View Face Detection Methods and Apparatuses" and filed on Jul. 16, 2003, which is hereby incorporated by reference.

The computing device on which the face detection system is implemented may include a central processing unit, memory, input devices (e.g., keyboard and pointing devices), output devices (e.g., display devices), and storage devices (e.g., disk drives). The memory and storage devices are computer-readable media that may contain instructions that implement the face detection system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the face detection system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The face detection system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

The face detection system selects the post-filtering components to optimize precision rate and recall rate of the detectors. Precision rate and recall rate are two measures of detector accuracy. Precision rate refers to the number of correctly detected faces divided by the number of total detected faces. For example, if a collection contains 100 windows with faces and 10 million windows without faces and 91 windows are correctly classified as having a face and 1 window is incorrectly classified as having a face, then the precision rate is 98.91% (i.e., 91/92). Recall rate refers to the number of windows correctly detected as having a face divided by the number of windows with faces. Continuing with the example, the recall rate is 91% (i.e., 91/100). Another measure of accuracy is false alarm rate, which is the number of windows without faces classified as having a face divided by the number of windows without faces. Continuing with the example, the false alarm rate is $1e^{-7}$. If a post-filtering component has a recall rate of s and a false alarm rate of f, then the overall recall rate and precision rate of the multi-view detector is represented by the following equations:

$$R_{recall} = \sum_{0 \leq i < m} p_i \check{s}_i s_i \quad (1)$$

$$R_{prec} = \left[ 1 + k \sum_{0 \leq i < m} \check{f}_i f_i f_i \bigg/ \sum_{0 \leq i < m} p_i \check{s}_i s_i \right]^{-1} \quad (2)$$

where $R_{recall}$ is the recall rate, m is the number of detectors, $s_i$ is the recall rate of the classifier i, $f_i$ is the false alarm rate of classifier i, š is the recall rate of the post-filtering component, f̌ is the false alarm rate of the post-filtering component, and k is the ratio of the windows without faces to the windows with faces.

The face detection system selects pre-filtering and post-filtering components to reduce the overall computational cost and maximize the overall recall rate with the constraint that the precision rate is above a minimum acceptable precision rate. The precision rate of a classifier is represented by the following equation:

$$R_{prec}^i = [1 + k f_i/(p_i s_i)]^{-1} \quad (3)$$

The minimum acceptable precision rate is represented by the following equation:

$$R_{prec} \geq R^*_{prec} \quad (4)$$

Applying Equation 3 to Equation 4 results in a constraint represented by the following equation:

$$\check{f}_i/\check{s}_i \leq (\lambda p_i s_i)/(k f_i) = p_i \lambda/\lambda_i \quad (5)$$

where $\lambda_i = k f_i/s_i = (1 - \overline{R}_{prec}^i)/\overline{R}_{prec}^i$ and $\lambda = (1 - R^*_{prec})/R^*_{prec}$, and $\overline{R}_{prec}^i$ is the precision rate on the sample set. The combination of the pre-filtering component and post-filtering component can be represented by the following equation:

$$(\check{f}_i^{pre}/\check{s}_i^{pre})(\check{f}_i/\check{s}_i) \leq p_i \lambda/\lambda_i \quad (6)$$

where $\check{f}_i^{pre}$ is the false alarm rate of the pre-filtering component and $\check{s}_i^{pre}$ is the recall rate of the pre-filtering component. Assuming that the computational cost of a filter is small and false positives are far outnumbered by true positives after the pre-filtering stage, then the cost for the original component detector is $\check{f}_i^{pre} * c_i$, where $c_i$ is the computational cost of the $i^{th}$ classifier. The face detection system allocates the computational cost for each original component detector based on its contribution to the overall recall rate. The face detection system assigns a weight of $(\sqrt{p_i s_i}^{-1})$ to each component detector. The combination of maximizing recall rate and minimizing computational cost results in a maximization target represented by the following equation:

$$T = \check{s}_i^{pre} \check{s}_i - \alpha(c_i/\sqrt{p_i s_i}) \check{f}_i^{pre} \quad (7)$$

where α is the Bayes cost to balance recall rate and computational cost. The face detection system represents the solution as a two-step optimization problem. The first step is represented by the following equation:

$$T_1 = \check{s}_i^{pre} - \alpha(c_i/\sqrt{p_i s_i}) \check{f}_i^{pre} \quad (8)$$

The second step is represented by the following equations:

$$T_2 = \check{s}_i \quad (9)$$

$$\check{f}_i/\check{s}_i \leq \gamma p_i \lambda/\lambda_i, \gamma = \check{s}_i^{pre}/\check{f}_i^{pre} \quad (10)$$

The face detection system optimizes the overall recall rate and computational cost by first collecting prior probabilities on a large sample collection of images. For each view, the face detection system determines the precision rate for the sample collection, trains the pre-filtering component with the optimizing target set to maximize Equation 8, and trains the post-filtering component with the optimizing target set to maximize $s_i$ under the constraint of Equation 10. In one embodiment, the face detection system uses a wavelet pixel based feature for post-filtering. The face detection system trains a $2^{nd}$ degree polynomial support vector machine ("SVM") classifier under the constraint of Equation 10.

One skilled in the art will appreciate that any number of detectors may be used by the face detection system. Table 1 lists views of detectors along with their prior probability in one embodiment.

TABLE 1

| | Yaw | Roll | Prior |
|---|---|---|---|
| View 0 | −30, 30 | −15, 15 | 75.3% |
| View 1 | −90, −60 | −15, 15 | 5.33% |
| View 2 | 60, 90 | −15, 15 | 5.47% |
| View 3 | −30, 30 | −37, −7 | 16.7% |
| View 4 | −30, 30 | 7, 37 | 15.9% |
| View 5 | −30, 30 | −60, −30 | 1.24% |
| View 6 | −30, 30 | 30, 60 | 1.21% |
| View 7 | −30, 30 | −83, −53 | 0.66% |
| View 8 | −30, 30 | 53, 83 | 0.36% |
| View 9 | −30, 30 | −105, −75 | 1.02% |
| View 10 | −30, 30 | 75, 105 | 0.6% |

Figure 2:
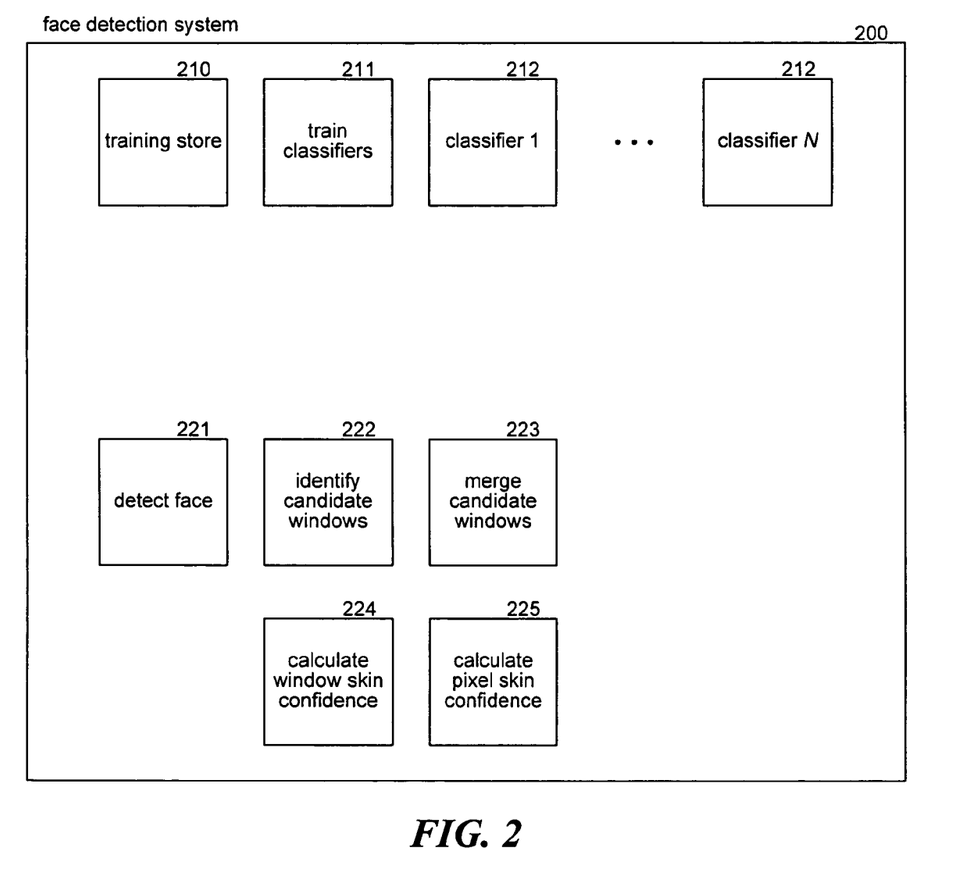
FIG. 2 is a block diagram illustrating components of the face detection system in one embodiment.

FIG. 2 is a block diagram illustrating components of the face detection system in one embodiment. The face detection system 200 includes a training store 210, a train classifiers component 211, and classifiers 212. The training store contains sample images along with an indication of whether the images contain a face and if so the view angle of the face. The train classifiers component selects the images with a certain view angle and then trains a classifier to detect images at that view angle. A detect face component 221 implements the overall functions of the face detection system. The detect face component inputs an image and invokes an identify candidate windows component 222 for each view. The identify candidate windows component selects windows of increasing size within the image and calculates a window skin confidence for each window. If the window skin confidence is above a threshold level that is based on the prior probability of the view, then the component invokes the classifier for that view to classify the window. The windows that are classified as containing a face are the candidate windows. The component invokes a calculate window skin confidence component 224 to calculate the window skin confidence of a window, which in turn invokes a calculate pixel skin confidence component 225 to calculate the skin confidence of the pixel. The detect face component invokes a merge candidate windows component 223 to discard and/or merge candidate windows.

Figure 3:
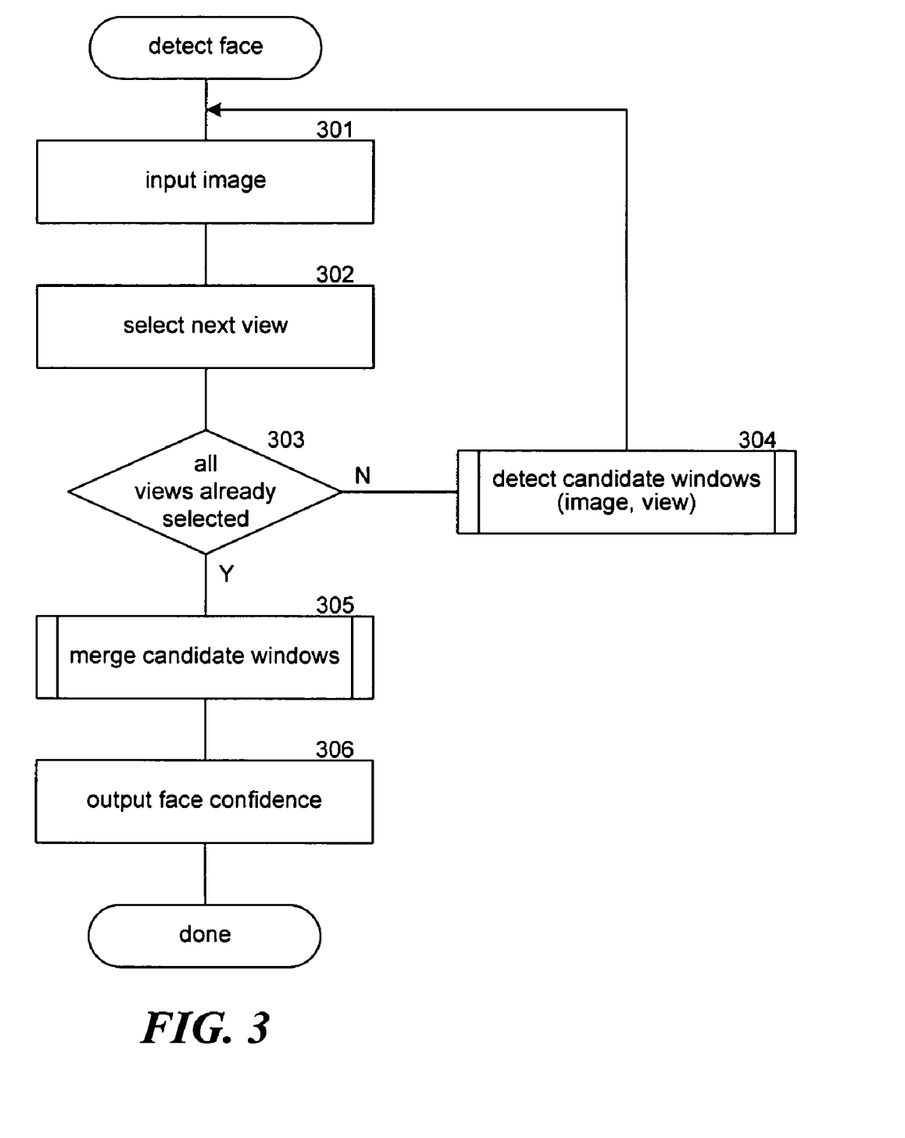
FIG. 3 is a flow diagram that illustrates the overall processing of a component that implements the face detection system in one embodiment.

FIG. 3 is a flow diagram that illustrates the overall processing of a component that implements the face detection system in one embodiment. The face detection system inputs an image and outputs a face confidence indicating the likelihood that the image contains a face. The component loops identifying candidate windows based on each view detector and then merges the identified candidate windows. The system may also post-filter the identified candidate windows to further reduce the candidate windows. In block 301, the component inputs the image. In blocks 302-304, the component loops identifying candidate windows for each view. In block 302, the component selects the next view. In decision block 303, if all the views have already been selected, then the component continues at block 305, else the component continues at block 304. In block 304, the system invokes the identify candidate windows component to identify candidate windows within the image that contain faces and then loops to block 302 to select the next view. In block 305, the component invokes the merge candidate windows component to discard candidate windows and merge nearby candidate windows that may contain faces into a single candidate window. In block 306, the component outputs the face confidence that the image contains a face.

Figure 4:
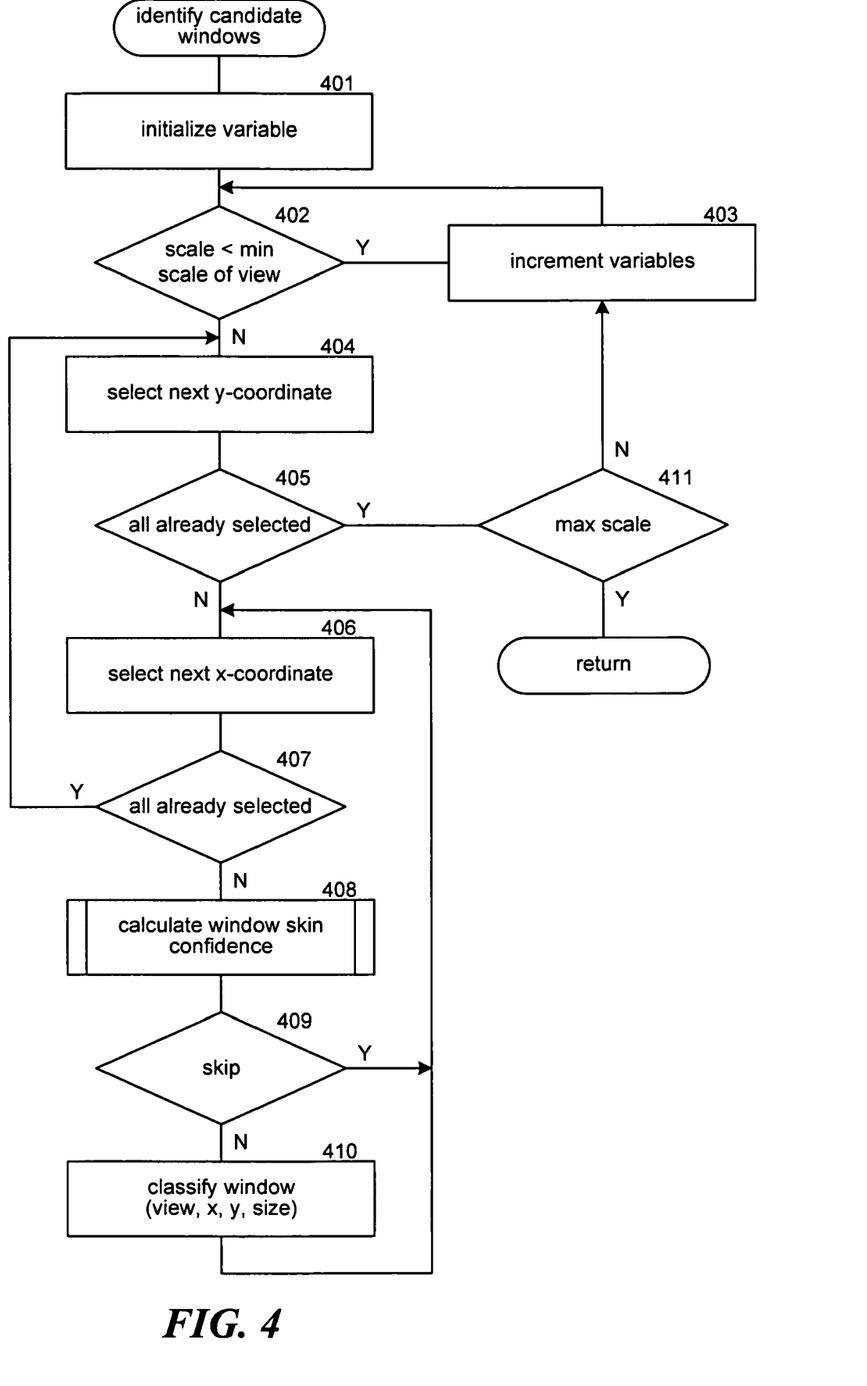
FIG. 4 is a flow diagram that illustrates the processing of the identify candidate windows component of the face detection system in one embodiment.

FIG. 4 is a flow diagram that illustrates the processing of the identify candidate windows component of the face detection system in one embodiment. The component is invoked for each view and is passed an indication of the view. The component loops selecting increasingly larger scales and determining whether the windows of the scale likely contain a face by invoking the detector for the passed view. In block 401, the component initializes variables for classifying windows. The component initializes a scale variable to 1 to indicate that the smallest scale is selected and initializes a window size variable (e.g., 20) to the smallest window size. The component also initializes a step scale variable (e.g., 1.15) and a step size variable (e.g., 1). The step scale variable indicates the increase of the window size for each iteration, and the step size variable indicates the distance between the upper left corners of successive windows at the current scale. In blocks 402-403, the component loops increasing the scale until the minimum scale for the view is reached. In block 402, if the current scale is less than the minimum scale for the view, then the component continues at block 405, else the component continues at block 404. In block 403, the component increments the variables. In particular, the component increments the scale variable by 1 and multiplies the window size by the step scale and the step size by the step scale. The component loops to block 402 to check if the minimum scale has been reached. In blocks 404-410, the component loops classifying each window at the current scale. In block 404, the component selects the y-coordinate upper left corner for the next window by adding the step size to the previously selected y-coordinate. In decision block 403, if the selected y-coordinate is within the window size distance of the bottom of the image, then another window will not fit within the image and the component continues at block 411, else the component continues at block 406. In block 406, the component selects the x-coordinate of the upper left corner for the next window by adding the step size to the previously selected x-coordinate. In decision block 407, if the selected x-coordinate is within the window size distance of the right portion of the image, then another window will not fit within the image and the component loops to block 404 to select the next y-coordinate, else the component continues at block 408. In block 408, the component invokes the calculate window skin confidence for the selected window whose upper left corner is at the selected x-coordinate and selected y-coordinate and has a size indicated by the window size variable. In decision block 409, if the window skin confidence indicates that the window should not be classified, then the component loops to block 406 to select the next x-coordinate, else the component continues at block 410. The component skips the classification of the window based on the window skin confidence in relation to the prior probability associated with the view. In one embodiment, the component skips the classification when the window skin confidence is less than a threshold value that is calculated based on the prior probability. For example, the threshold value may be $((0.8-pp)*0.14)$ where pp is the prior probability (e.g., if pp is 0.2, then the threshold value is 0.84). In block 410, the component invokes the classify window component passing the selected window. The component then loops to block 406 to select the next x-coordinate. In decision block 411, if the scale is at the largest scale, then the component completes, else the component continues at block 403 to increment the variable and process windows for the next scale.

Figure 5:
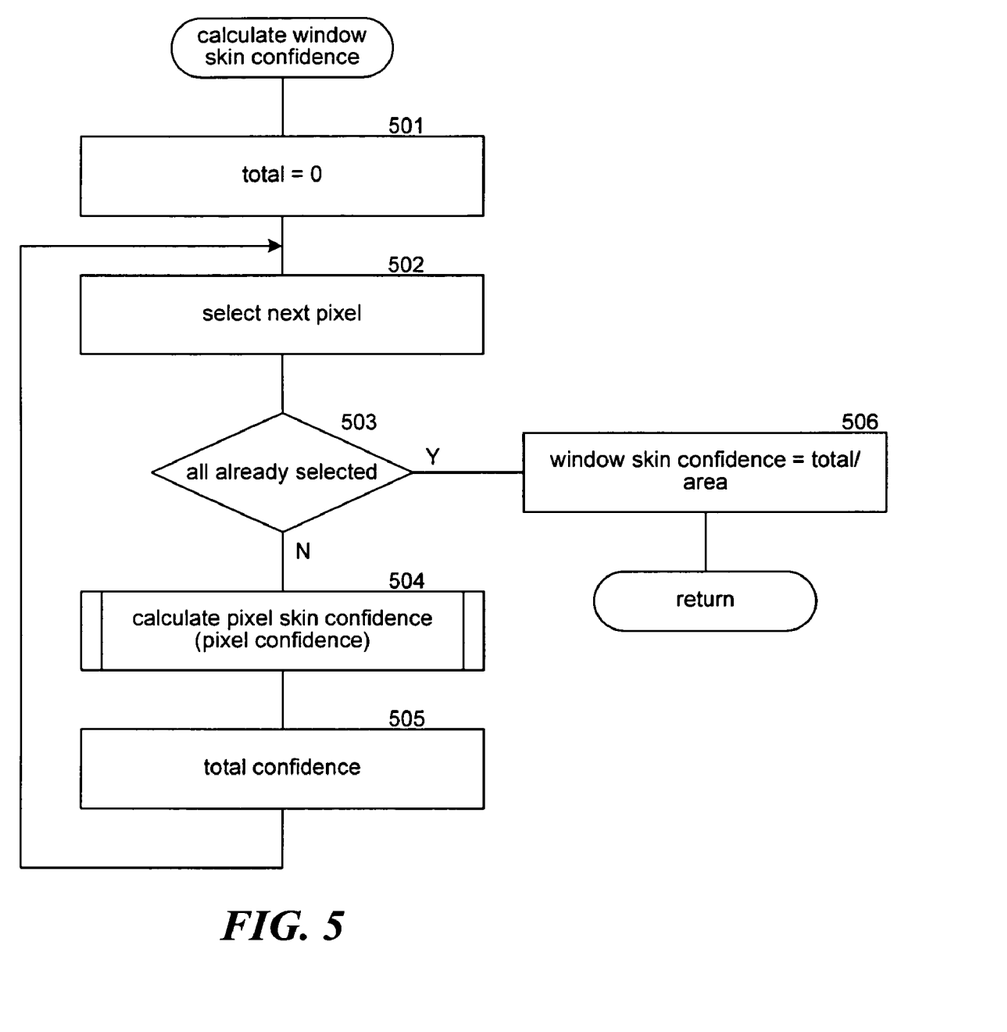
FIG. 5 is a flow diagram that illustrates the processing of the calculate window skin confidence component in one embodiment.

FIG. 5 is a flow diagram that illustrates the processing of the calculate window skin confidence component in one embodiment. The component inputs a window and calculates a window skin confidence indicating the likelihood that the window is a skin color region. In one embodiment, the component may speed up the skin confidence computation using integral image as described in P. A. Viola and M. J. Jones, "Robust real-time object detection," Technical Report, COMPAQ Cambridge Research Laboratory, Cambridge, Mass., February 2001. In block 501, the component initializes the total for the window. In blocks 502-505, the component loops calculating a pixel skin confidence for each pixel within the window and totaling the pixel skin confidences. In block 502, the component selects the next pixel. In decision block 503, if all the pixels have already been selected, then the component continues at block 506, else the component continues at block 504. In block 504, the component invokes the calculate pixel skin confidence component passing the selected pixel and receiving the pixel confidence in return. In block 505, the component adds the pixel confidence to the total and then loops to block 502 to select the next pixel. In block 506, the component calculates the window skin confidence by dividing the total by the number of pixels in the window. The component then returns the window skin confidence.

Figure 6:
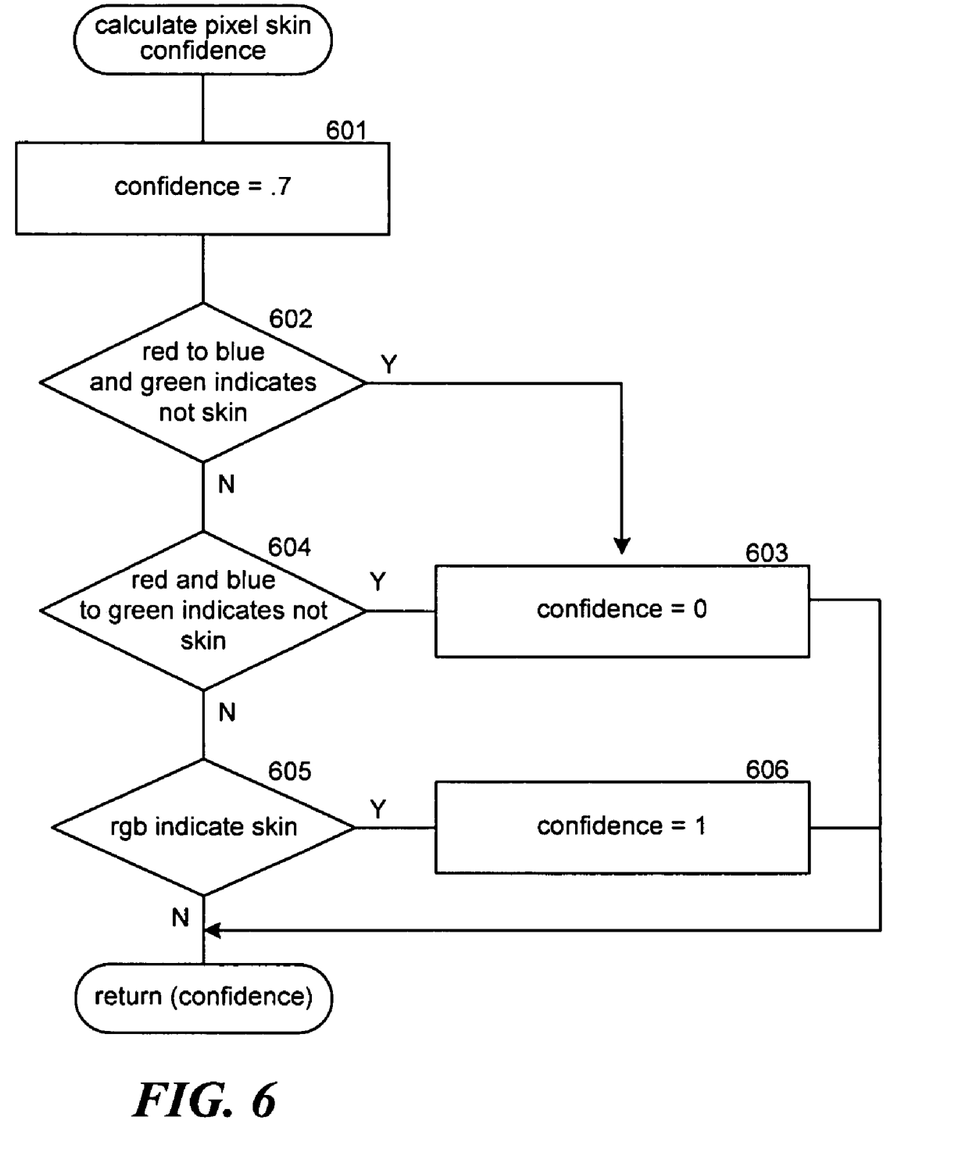
FIG. 6 is a flow diagram that illustrates the processing of the calculate pixel skin confidence component in one embodiment.

FIG. 6 is a flow diagram that illustrates the processing of the calculate pixel skin confidence component in one embodiment. The component is passed a pixel and calculates a pixel skin confidence indicating a likelihood that the pixel corresponds to skin color. In block 601, the component sets the initial pixel skin confidence to 0.7. In decision block 602, if the relationship of the red value of the passed pixel to the combination of the blue and green values of the passed pixel indicates that the passed pixel is not skin, then the component continues at block 603, else the component continues at block 604. For example, the relationship may be $(0.7024*r+12<0.0211*g+0.681*b)$. In block 603, the component sets the pixel skin confidence to indicate that the pixel is not skin color and then returns the pixel skin confidence. In decision block 604, if the relationship between the combination of the red and blue of the passed pixel to the green of the passed pixel indicates that the passed pixel is not skin, then the component continues at block 603, else the component continues at block 605. For example, the relationship may be $(0.3861*r+0.256*b+2.5<0.6423*g)$. In decision block 605, if the relationship between the red, green, and blue of the passed pixel indicates that the pixel represents skin color, then the component continues at block 606, else the component returns the pixel skin confidence. For example, the relationship may be $((r>70)\ \&\&\ (g>30)\ \&\&\ (b>15)\ \&\&\ (r>g)\ \&\&\ (r>b)\ \&\&\ (r-g>13))$. In block 606, the component sets the pixel skin confidence to one and then returns the pixel skin confidence.

Figure 7:
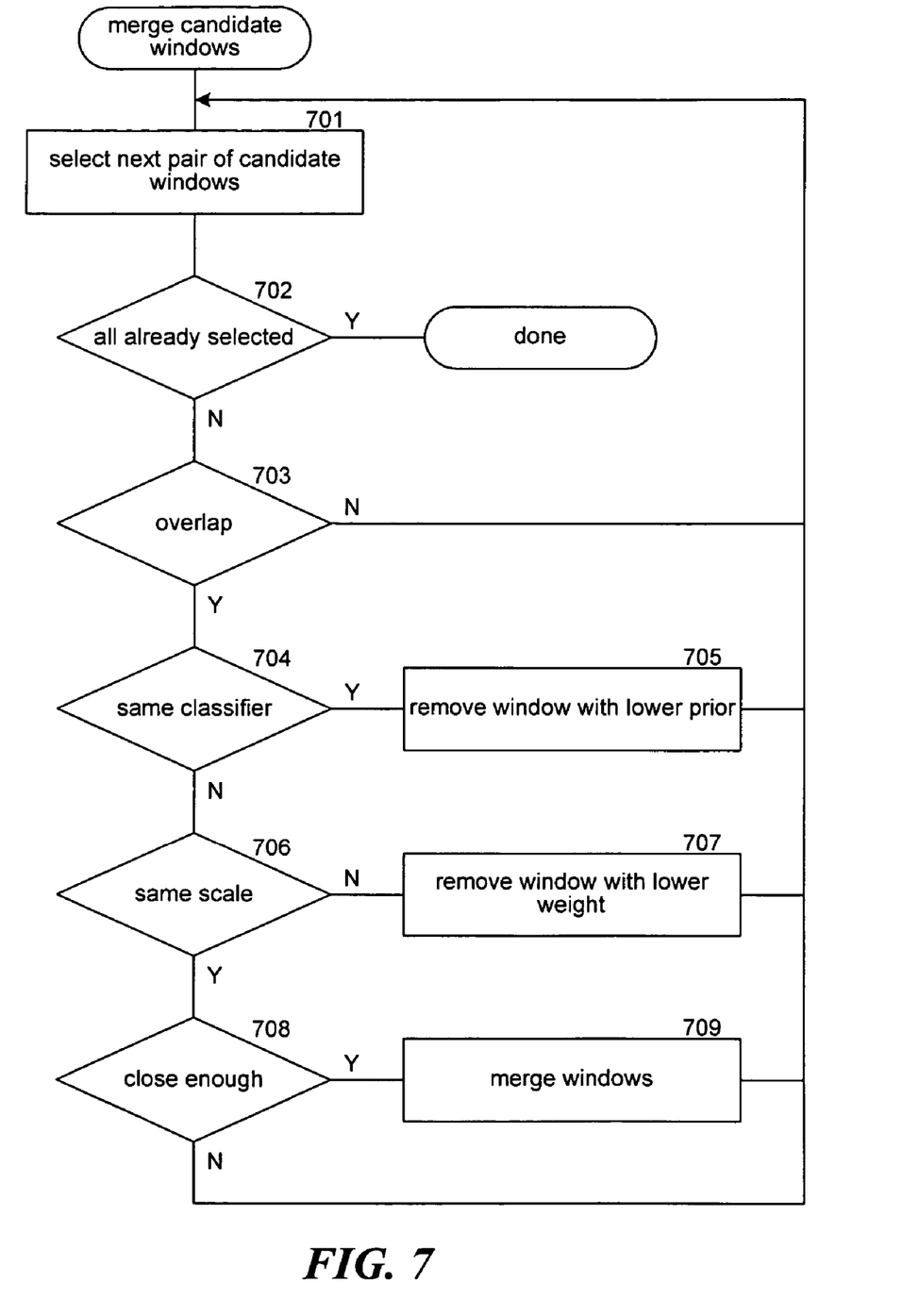
FIG. 7 is a flow diagram that illustrates the processing of the merge candidate windows component in one embodiment.

FIG. 7 is a flow diagram that illustrates the processing of the merge candidate windows component in one embodiment. In block 701, the component selects the next pair of candidate windows. In decision block 702, if all the pairs of candidate windows have already been selected, the component completes, else the component continues at block 703. In decision block 703, if the selected candidate windows overlap, the component continues at block 704, else the component loops to block 701 to select the next pair of candidate windows. In decision block 704, if the candidate windows were classified by the same classifier, the component continues at block 705, else the component continues at block 706. In block 705, the component removes the selected window with the lower prior probability and loops to block 701 to select the next pair of candidate windows. In decision block 706, if the candidate windows are at the same scale, then the component continues at block 708, else the component continues at block 707. In block 707, the component removes the window with the lower weight and then loops to block 701 to select the next pair of candidate windows. In decision block 708, if the windows are close enough to merge, then the component mergers the windows in block 709. The component then loops to block 701 to select the next pair of candidate windows.

From the foregoing, it will be appreciated that specific embodiments of the face detection system have been described herein for purposes of illustration, but that various modifications may be made without deviating from the spirit and scope of the invention. The face detection system can be used to recognize objects of various types other than faces, such as vehicles, armament, and so on. Accordingly, the invention is not limited except as by the appended claims.

We claim:

1. A method in a computer system for detecting whether an image contains a face, the method comprising:
   providing a collection of images, the images having faces at various views: for each of a plurality of views, providing a prior probability that faces in images of the collection will be at that view based on a percentage of the faces in the images of the collection that are at that view;
   providing detectors for determining whether a window of an image contains a face, each detector adapted to detect faces with a certain view;
   providing a filter for each detector, the filter for filtering out windows based on a the prior probability associated with the view of the detector;
   after the prior probabilities have been provided, receiving an image for detecting whether the image contains a face; and
   for each window of the received image,
   generating a score relating to a likelihood that the received image contains a face; and
   for each detector,
      applying the filter of the detector to filter out the window when the generated score does not satisfy a threshold score, such that the threshold score is higher for filters of detectors of views with lower prior probabilities and lower for filters of detectors of views with higher prior probabilities; and
      applying the detector to the window when the window has not been filtered to identify a candidate window containing a face.

2. The method of claim 1 wherein a provided filter is applied to limit the windows to which a detector is applied.

3. The method of claim 2 wherein a provided filter is a skin color filter.

4. The method of claim 1 wherein a provided filter is applied to reduce the candidate windows after a detector is applied.

5. The method of claim 1 including merging candidate windows that overlap.

6. The method of claim 1 wherein the detectors are applied to windows of various sizes.

7. The method of claim 6 wherein the prior probability associated with a detector is used to determine to which sizes of window the detector is applied.

8. The method of claim 1 wherein a detector is a chain adaptive boosting detector.

9. A computer-readable storage medium containing instructions for controlling a computer system to detect whether a first image contains an object by a method comprising:
   for each of a plurality of views, providing a prior probability indicating a probability that objects within images of a collection of images will be in that view; and
   after providing a prior probability for each view, detecting whether the first image contains an object by,
      dividing the first image into windows of different sizes; and
      for each of a plurality of views,
         designating windows as candidate windows based on a filter criterion that factors in the prior probability of the designating being based on a threshold that varies with the prior probability of the view such that a view with a higher prior probability has more windows designated than a view with a lower prior probability; and
         applying a detector for the view to the candidate windows to detect which candidate windows contain the object; and
         merging overlapping candidate windows that are detected to contain the object
   such that the detector for a view with a higher prior probability is applied to more candidate windows of the first image than a detector with a view with a lower prior probability resulting in more computational effort being allocated to detectors for views with higher prior probabilities.

10. The computer-readable storage medium of claim 9 wherein the merging factors in a prior probability of a detector that detected that the candidate window contains the object.

11. The computer-readable storage medium of claim 9 wherein the object is a face.

12. The computer-readable storage medium of claim 11 wherein the filter criterion is based on skin color.

13. The computer-readable storage medium of claim 11 wherein the prior probability associated with a detector is used to determine to which sizes of windows the detector is applied.

14. The computer-readable storage medium of claim 11 wherein a detector is a chain adaptive boosting detector.

15. A computer system for detecting whether an image contains a face, comprising:
   a detector for each of a plurality of views of a face;
   a data store having a prior probability for each of the plurality of views, a prior probability indicating a probability that faces from a collection of images will be at the view;
   a component that determines sizes of windows to be processed by detectors based on prior probabilities of views
   a component that, after sizes of the windows are determined, receives an indication of an image for detecting whether the image contains a face;
   a component that determines which windows of the received image of which determined sizes should have which detector applied based on the view of the detector and the prior probability of that view, such that the determining is based on a threshold that varies with the prior probability of the view; and a component for merging windows detected by the detectors to have faces wherein more computational effort is allocated to detectors for views with higher prior probabilities.

16. The computer system of claim 15 wherein the detectors are chain adaptive boosting detectors.

* * * * *

UNITED STATES PATENT AND TRADEMARK OFFICE
CERTIFICATE OF CORRECTION

PATENT NO.       : 7,590,267 B2
APPLICATION NO.  : 11/142817
DATED            : September 15, 2009
INVENTOR(S)      : Xiao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 992 days.

Signed and Sealed this

Twenty-first Day of September, 2010

David J. Kappos
*Director of the United States Patent and Trademark Office*